United States Patent
Imperato et al.

(10) Patent No.: US 6,792,080 B1
(45) Date of Patent: Sep. 14, 2004

(54) SYSTEM AND METHOD FOR TESTING ENHANCED 911 SIGNALLING OVER A DIGITAL LOOP CARRIER TRUNK

(75) Inventors: Anthony Imperato, Thiells, NY (US); David Reagan Rice, Morristown, NJ (US); Shan Yueh, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 382 days.

(21) Appl. No.: 09/584,379

(22) Filed: May 31, 2000

(51) Int. Cl.[7] .......................... H04M 1/24; H04M 3/08; H04M 3/22
(52) U.S. Cl. ..................... 379/29.02; 379/1.01; 379/22; 379/22.01; 379/22.04; 379/26.01; 379/29.01
(58) Field of Search ............................... 379/1.01, 1.03, 379/9, 10.01, 15.01, 22, 22.02, 22.04, 26.01, 27.01, 27.02, 27.03, 27.08, 29.01, 29.02, 32.01, 32.02, 45, 50

(56) References Cited

U.S. PATENT DOCUMENTS

| | | | | |
|---|---|---|---|---|
| 4,843,620 A | * | 6/1989 | Hagedorn | 379/21 |
| 5,065,422 A | * | 11/1991 | Ishikawa | 379/11 |
| 5,187,732 A | * | 2/1993 | Suzuki | 379/15.01 |
| 5,579,368 A | * | 11/1996 | van Berkum | 379/15.01 |
| 5,933,475 A | * | 8/1999 | Coleman | 379/1.01 |
| 5,953,390 A | * | 9/1999 | Olson | 379/9 |
| 6,320,939 B1 | * | 11/2001 | Nulty et al. | 379/27.01 |
| 6,327,342 B1 | * | 12/2001 | Mobley et al. | 379/45 |

* cited by examiner

Primary Examiner—Quoc Tran

(57) ABSTRACT

A method and system for automatically testing E911 systems using digital loop carrier trunks in a laboratory. A testbed running a testing program evaluates the functionality of a digital loop carrier trunk, a channel unit pair, and an E911 switch by measuring a delay and duration of an acknowledgement pulse from the E911 switch in response to an off-hook condition at a simulated PBX. The testbed and testing program also evaluate the functionality of the E911 switch and a simulated PSAP by measuring a delay and duration of a ring signal from the E911 switch in response to an emergency signal sent by the simulated PBX. Once connection between the simulated PBX and the simulated PSAP has been established, the end-to-end signal loss is also measured.

16 Claims, 4 Drawing Sheets

SYSTEM AND METHOD FOR TESTING ENHANCED 911 SIGNALLING OVER A DIGITAL LOOP CARRIER TRUNK

BACKGROUND OF THE INVENTION

1. Field of the Invention

The present invention relates to signaling for enhanced 911 systems, and more specifically, to testing such signaling over digital loop carrier arrangements.

2. Description of the Related Art

Enhanced 911 (E911) service refers to establishing communication between customer telephones and the nearest Public Safety Answering Point (PSAP), which is an answering location for 911 calls originating in a given geographic area.

The operation of this E911 service will now be described with reference to the prior art E911 system 100 shown in FIG. 1. All communication paths in this system 100 are conventional two-wire paths, which use a "tip" wire and a "ring" wire to define a loop (also known as a channel) used for communication. In this system, one of the customer telephones 110 goes "off-hook" to report an emergency by dialing 911. In response to the dialed digits, the associated Private Branch Exchange (PBX) 120 senses this off-hook condition, which is a low resistance tip-to-ring path. The PBX 120 is typically large, with many telephones 110 widely dispersed, to merit the deployment of a dedicated analog E911 trunk 155. Such an E911 trunk is typically dedicated solely for E911 service, and is configured for outward (i.e., PBX-originated) communication. After sensing the off-hook condition, the PBX 120 seizes the trunk 155 (i.e., wires between the PBX 120 and the local central office (CO) 160) by closing the loop defined by the tip/ring pair of wires in the trunk 155. A trunk seizure condition in E911 signaling is defined as a call state initiated by the PBX 120 in response to a customer telephone 110 in which the CO 160 prepares to receive signals.

After the CO 160 acknowledges seizure of the trunk 155 by reversing the battery polarity applied to the trunk 155, the PBX 120 sends two separate data messages: one identifying the E911 switch (170) to handle the call during the emergency, and the second identifying the telephone 110. An E911 switch 170 may be a central office switch which has been programmed to handle E911 signaling and switching. As used herein, the term "E911 switch" refers to either the above-described E911 CO simulator, or a dedicated E911 switching unit. When the E911 switch 170 receives the messages identifying the closest PSAP 130 and the calling telephone 110, the E911 switch 170 makes a connection to the closest PSAP 130. In some implementations a separate box 150 interfaces the PBX 120 to the trunk 155, to provide E911 compatibility to a legacy PBX. The data messages between the PBX 120 and the CO 160 are sent using a multi-frequency (MF) protocol, which uses pairs of tones with frequencies contained within the voice bandwidth of the respective channel units (not shown, but defined as those units which control communication along one or more communication channels) in and between the PBX 120 and CO 160. Thus, the DC signaling characteristics of the channel units operating the PBX/CO link are used only for supervision in initiating the E911 call and in terminating it.

The above-described E911 service, where the PBX 120 seizes the trunk 155 by closing the loop and the CO 160 terminates the trunk 155 by applying reverse battery polarity to acknowledge, is used on a conventional analog trunk 155. Such signaling between the PBX 120 and CO 160 is generically termed "loop reverse battery" (LRB) signaling. This E911 interface at the PBX end is specified by an American National Standards Institute (ANSI) standard, ANSI T1.411-1995, "Interface between Carriers and Customer Installation—Analog Voicegrade Enhanced 911 Switched Access Using Network-Provided Reverse-Battery Signaling."

Recently, so-called digital loop carrier (DLC) systems have been developed and implemented, where a larger number of channels may be implemented on fewer wires than in a conventional analog network. DLC channel units accomplish this greater channel density by time division multiplexing digital data for a number of channels onto two pairs of wires. For example, 24 communication channels may be implemented on two wire pairs in a DLC system, whereas the two wires only provide one channel in an analog implementation.

As shown in FIG. 2, DLC channel units 210, 220 are typically located in a central office terminal (COT) 250 in the CO 160, and in a remote terminal (RT) 200 near the PBX 120 to coordinate signaling therebetween. DLC trunks 230 and 240 are able to be seized only by an originating channel unit 210, so in a seizure sense, the trunks arc unidirectional. However, once communication has been established between the CO and PBX, two-way traffic occurs over the DLC trunk. RT 200 includes an originating channel unit 210 connected to DLC trunk 230, which is terminated by terminating channel unit 220 in COT 250. Originating channel unit 210 in the RT 200 seizes the trunk 230 when a PBX originated call occurs. Similarly, DLC trunk 240 is seized by channel unit 210 in the COT 250.

Telcordia (previously named Bellcore) has published three standards for DLC systems that specify signaling arrangements between a central office (CO) and a Private Branch Exchange (PBX) for direct-inward-dialing (DID) service (i.e., calls originating from the central office) using the loop reverse battery (LRB) signaling protocol. These standards are termed TR-08, TR-57, and GR-303. TR-08 and GR-303 cover "integrated" DLC systems (i.e., a digital facility terminated directly by a digital interface of a switch used to connect one channel to another in the central office). TR-57 specifies requirements for a "universal" DLC that uses a central office terminal (COT) 250 to convert the digital signal from the DLC 230 to an analog signal which is sensed by an analog switch 260 in the CO. In conventional DID service, the CO 160 seizes the DLC trunk 240, and the PBX 120 acknowledges such seizure via a RT 200 which contains a DLC channel unit 220. A trunk seizure condition conventional DID service is defined as a call state initiated by the CO in which the PBX prepares to receive incoming signals.

Where the telephone company employs a universal DLC system to assist in connecting the CO switch and the PBX over the loop pair, the channel units of the DLC system at the remote terminal (RT) location present the same interface to the PBX as do the channel units of a conventional analog CO. Similarly, the COT channel units present the same interface to the switch in the CO as do the channel units of a conventional analog PBX. As mentioned above, the DLC systems in use today seize the trunk at the CO to implement DID. However, E911 service mandates seizing the trunk at the PBX, and such trunk seizure is not specified by any of the existing TR-08. TR-57, or GR-303 digital loop carrier standards.

Accordingly, a manner of implementing enhanced 911 service on digital loop carrier systems is needed. Further, the above-described conventional analog enhanced 911 systems are difficult to test prior to deployment, and, once they are deployed, each channel must be tested individually. Thus, a method of testing enhanced 911 service on digital loop carrier systems prior to deployment is also needed.

SUMMARY OF THE INVENTION

The present invention provides a method and system for rapidly and automatically testing E911 systems using digital loop carrier trunks in a laboratory prior to deployment. A testbed running a testing program evaluates the functionality of a digital loop carrier trunk, a channel unit pair, and an E911 switch by measuring a delay and duration of an acknowledgement pulse from the E911 switch in response to an off-hook condition at a simulated PBX. The testbed and testing program also evaluate the functionality of the E911 switch and a simulated PSAP by measuring a delay and duration of a ring signal from the E911 switch in response to an emergency signal sent by the simulated PBX. Once connection between the simulated PBX and the simulated PSAP has been established, the end-to-end signal loss is also measured.

BRIEF DESCRIPTION OF THE DRAWINGS

It is to be understood that both the foregoing general description and the following detailed description are exemplary and explanatory and are intended to provide further explanation of the invention as claimed. Where feasible, the same reference numerals will be used to label similar elements.

The accompanying drawings are included to provide a further understanding of the invention, are incorporated in and constitute a part of this specification, illustrate one embodiment of the invention and together with the description serve to explain the principles of the invention.

DETAILED DESCRIPTION OF THE INVENTION

Universal Digital Loop Carrier

In one embodiment of the invention, channel units having LRB signaling capability are used to implement the E911 service outlined above over a DLC, thus applying the substantial efficiency of the digital carrier system to these E911 circuits.

Figure 1:
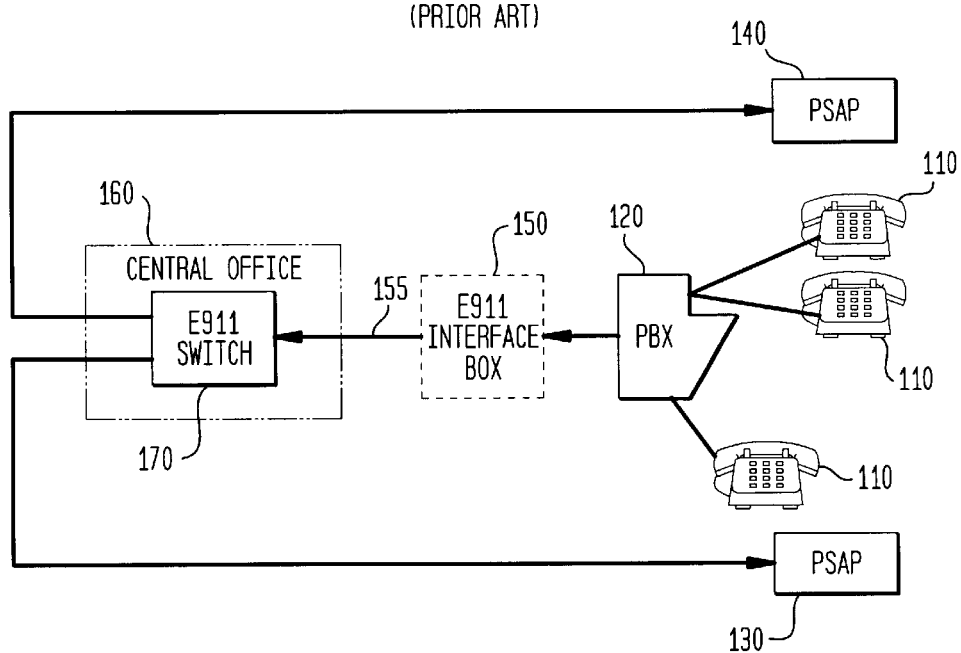
FIG. 1 illustrates a Prior Art enhanced 911 system utilizing analog telephone infrastructure.
Figure 2:
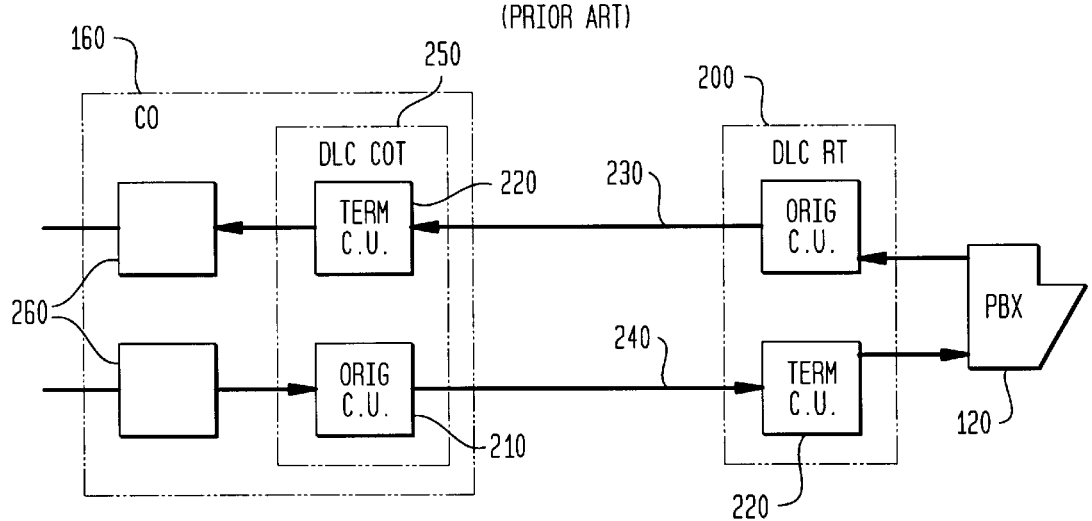
FIG. 2 illustrates a Prior Art digital loop carrier system for inward and outward dialing.
Figure 3:
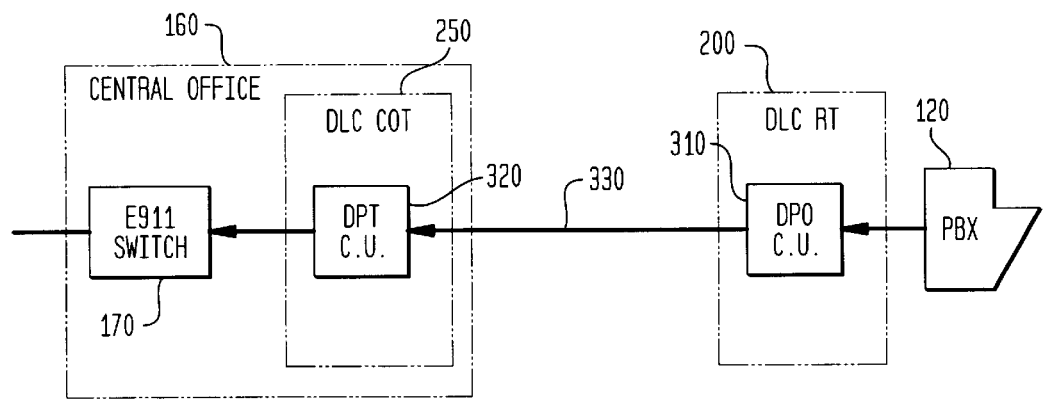
FIG. 3 illustrates a partial enhanced 911 system according to an embodiment of the invention using a universal digital loop carrier arrangement.

FIG. 3 shows a portion of an E911 system from PBX 120 through the connected remote terminal 200, which is connected to an E911 DLC trunk 330, which is in turn connected to the local CO 160. This embodiment of the invention places a "dial pulse originate" (DPO) type channel unit 310 at the RT 200. A DPO channel unit is typically connected to a terminal (in this case, the PBX) where the trunk seizure occurs. Similarly, a corresponding "dial pulse terminate" (DPT) type channel unit 320 is placed at the COT 250 located in the local central office 160. A DPT channel unit is typically connected to a terminal (in this case, the CO) which terminates the seized trunk and acknowledges the seizure. This DPO/DPT channel unit pair properly detects the PBX 120 conditions (e.g., an off-hook, closed loop electrical state) at the RT 200 and repeats them at the CO 160 for the E911 switch 170 to sense. The DPO/DPT pair also repeats the CO switch 160 conditions (e.g., a reverse battery polarity, trunk seizure acknowledge state) at the RT 200 for the PBX 120 to sense. In this manner, the universal DLC implementation shown in FIG. 3 appears transparent to the PBX 120 and the switch 170. Conventional loop closure and reverse battery signaling may be used by the PBX 120 and the switch 170 regardless of the presence of the channel units 310, 320 and the E911 DLC trunk 330.

It should be noted that the prior art T1.411 E911 standard does not specify use of DPT-type channel units for use with a central office switch. Nor does the standard specify a DLC trunk between the CO and the PBX. The E911 standard merely specifies the signaling order and convention required to implement the enhanced 911 functionality. Thus, it is standards-compliant for the channel units used by the DLC system to be any type that can repeat battery polarity changes and loop closure changes. This first embodiment of enhanced 911 signaling in universal DLC systems shown in FIG. 3 extends to the use of other channel units pairs other than the implementation (i.e., DPO/DPT channel units) described above, provided the channel units can repeat battery polarity changes and loop closure changes in LRB signaling. The digital signaling used to implement the above-described E911 service on a universal DLC will now be described.

In a typical DLC system, there are either two signaling channels per circuit, denoted by A and B, or more commonly, four signaling channels denoted by A, B, C, and D. These channels are carried over the digital loop carrier link by periodically using for signaling some of the bits that are otherwise used for the transmission of the voiceband traffic. This process is conventionally referred to as "robbed-bit signaling." The DPO/DPT signaling for implementing enhanced 911 service in universal DLC configurations is given in Table 1 below and summarized as follows. The signaling codes are ABCD=0000 for the RT 200 to transmit toward the switch 170 that the PBX 120 is in an idle, loop open condition, and ABCD=1111 to denote loop closure at the PBX 120. In the opposite (i.e., CO to RT) direction, ABCD=0XXX tells the RT 200 that the switch 170 wants the RT 200 to apply normal battery in the idle condition. Here, "X" denotes a digital "don't care" state, meaning that X can be either a 1 or a 0. ABCD=1XXX tells the RT 200 to reverse its battery polarity to signal that the switch 170 is ready to receive data addressing.

At the originating RT 200 with DPO-type channel units 310, the signals transmitted to the COT 250 in response to a sensed metallic condition at the PBX 120 are given in the top half of Table 1. The metallic conditions applied to the PBX 120 in response to signals received from the COT 250 are given in the lower half of the following Table 1.

TABLE 1

Conditions at Originating RT

| Metallic condition detected | Transmitted signal, ABCD = |
|---|---|
| Idle, loop open | 0000 |
| Trunk seizure, loop closed | 1111 |
| Received signal, ABCD = | Metallic condition applied |
| 0XXX | Idle, normal battery polarity |
| 1XXX | Acknowledge, reverse polarity |

Note: X denotes either 1 or 0.

At the terminating COT 250 with DPT-type channel units 320, metallic conditions applied to the switch 170 in response to signals received from the RT 200 are given in the top half of Table 2. The signals transmitted to the RT 200 in response to a sensed metallic condition at the switch 170 are given in the lower half of the following Table 2.

TABLE 2

Conditions at Terminating COT

| Received signal, ABCD = | Metallic condition applied |
|---|---|
| 0XXX | Idle, loop open |
| 1XXX | Seizure, loop closed |
| Metallic condition detected | Transmitted signal, ABCD = |
| Idle, normal battery polarity | 0000 |
| Acknowledge, reverse polarity | 1111 |

Note: X denotes either 1 or 0.

The signaling illustrated in Tables 1 and 2 above applies equally to a universal DLC system that uses only two signaling channels, A and B. The signaling codes for an A, B system are the same as for an A, B, C, D system except for the omission of the C and D states.

In an alternative embodiment, a loop start current feed channel unit 340 (not shown) may be substituted for DPO channel unit 310, and a loop start current sink channel unit 350 (not shown) may be substituted for DPT channel unit 320 in FIG. 3. Such a loop start current feed/sink pair would use loop start signaling, as is known to those skilled in the art. Where a pair of channel units with loop start signaling (e.g., 340, 350) is used, a different signaling table would apply, because the ABCD states would differ for idle and seizure states (i.e., some other states than 0000 and 1111). However, the responses of the channel unit pair, connected by the digital carrier, to the actions of the PBX and CO would be the same as those of the DPO/DPT channel unit pair using LRB signaling as given by the Tables 1 and 2 above.

Accordingly, the above-described embodiment of the invention enables enhanced 911 service in universal DLC systems by placing a DPO or loop start current feed channel unit at the remote terminal on the PBX side of the DLC. A method and system for testing the above-described E911 DLC system will now be discussed.

Digital Loop Carrier Testing System and Method

In the design of digital loop carrier systems, often it is desirable to test and validate the functionality of such systems prior to deployment in the field. The development of DLC-based methods of providing E911 service involves testing to verify that the method being developed produces the desired E911 functionality, and that the tested equipment is functioning correctly. Such testing is typically performed in a laboratory environment. In addition to the above-described E911 system employing DLC, the following testing configurations and protocols constitute another embodiment of the invention.

Figure 4:
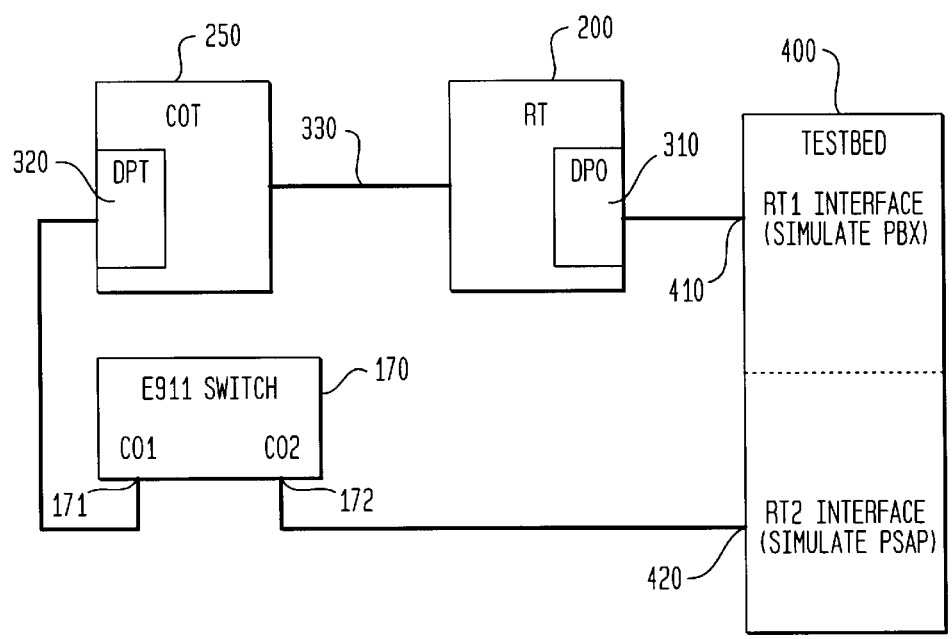
FIG. 4 illustrates a testing setup for enhanced 911 systems employing a universal DLC.

A testing setup for enhanced 911 systems employing universal DLC is shown in FIG. 4. In this figure, the DLC system remains the same from the remote terminal to the switch as that illustrated in FIG. 3. Accordingly, reference numerals used in FIG. 3 will be repeated. The DPO and DPT channel units 310 and 320 are connected via an INA DS1 digital loop carrier circuit 330. The E911 switch 170 includes a CO1 interface 171 connected to the DPT 320 in the COT 250. The E911 switch 170 also includes a CO2 interface 172 for connection to, for example, a PSAP.

As shown in FIG. 4, a multi-function testbed 400 simulates both a PBX and a PSAP. One example of a suitable piece of equipment for use as testbed 400 is the s765 Signaling and Transmission test system manufactured by Schlumberger Ltd. It should be appreciated that, for example, an s765 Signaling and Transmission test system includes generic input and output ports and waveform capture and digitizing capability, but these must be specifically configured to function as a PBX and PSAP via by a testing program, or script, resident within the testbed 400. The testbed 400 as configured by the resident testing program includes an RT1 interface 410 which simulates a PBX and which is connected to the RT DPO channel unit 310. The testbed 400 as configured by the resident testing program also includes an RT2 interface 420 which simulates a PSAP and which is connected to the E911 switch's CO2 interface 172.

Figure 5:
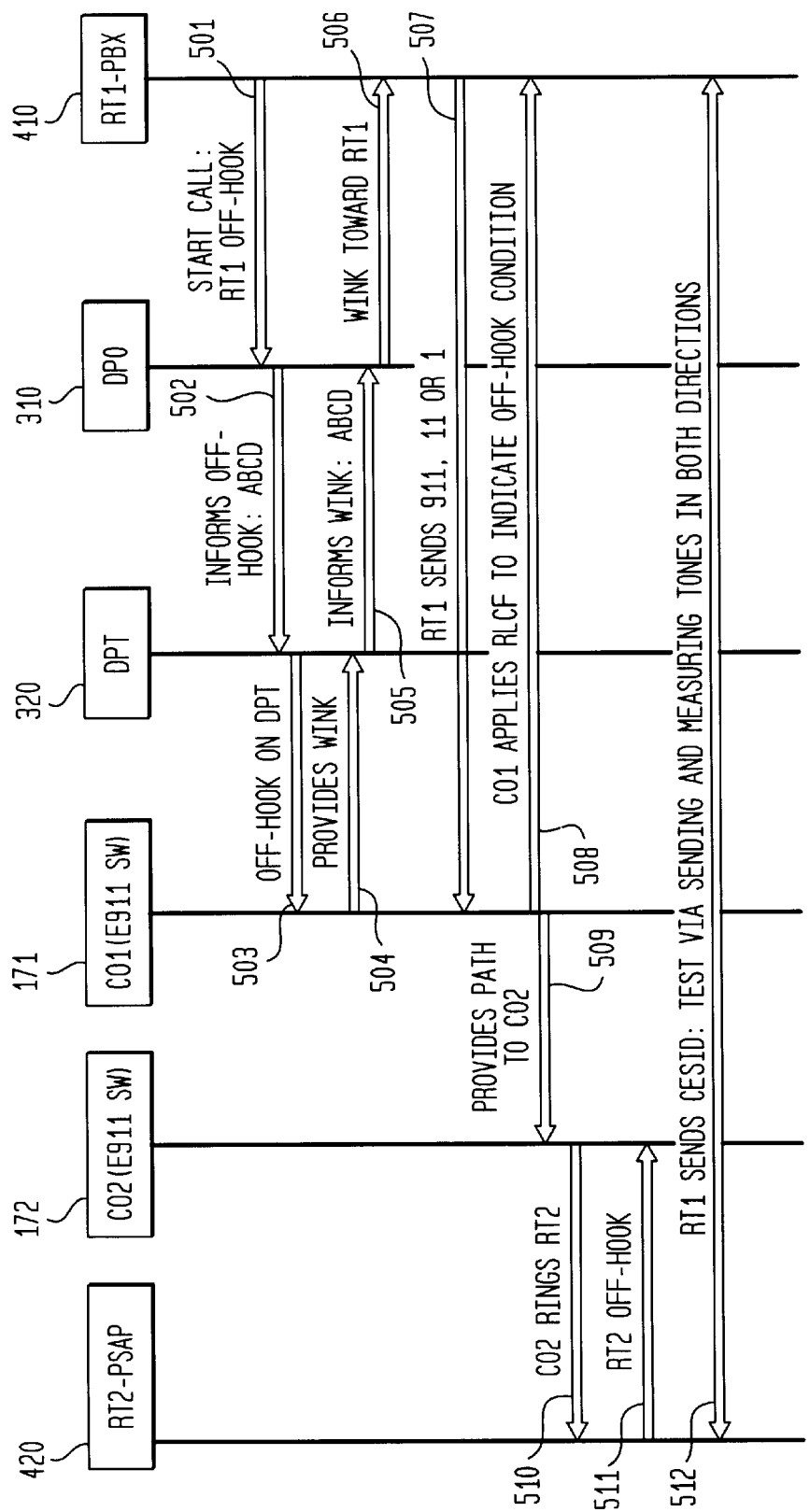
FIG. 5 illustrates a signaling flow for a method of testing using the testing setup of FIG. 4.

FIG. 5 shows the signaling flow among the RT1 interface 410, DPO channel unit 310, DPT channel unit 320, CO1 interface 171, CO2 interface 172, and RT2 interface 420 for testing the E911 setup shown in FIG. 4. The following testing method is implemented by a program, or script, resident within the testbed 400. Both of the simulated PBX (RT1 interface 410) and PSAP (RT2 interface 420) are initialized to be in an on-hook state (not shown). This is accomplished by having the testbed 400 apply 25.6K Ohm resistors across both tip-ring pairs of the RT1 interface 410 and RT2 interface 420. Then in step 501, the testbed 400 simulates the PBX going into an off-hook state by removing the 25.6 k Ohm resistor from the tip-ring pair of the RT1 interface 410, and instead applying a 430 Ohm resistor across the tip-ring pair. At this point the RT1 interface 410 awaits the arrival of an acknowledgement signal (also known as a "wink pulse") from the E911 switch 170. In step 502, the DPO channel unit 310 detects the off-hook state of the RT1 interface 410, and signals the DPT channel unit 320 of the off-hook condition via ABCD robbed-bit signaling. In step 503, the DPT channel unit 320, upon receiving the off-hook signal from the DPO channel unit 310, applies an off-hook state towards the E911 switch's CO1 interface 171. In step 504, upon detecting the off-hook state of the DPT channel unit 320, the CO1 interface provides an acknowledgement, or wink, signal to the DPT channel unit 320. In steps 505 and 506, this wink signal is successively propagated to the DPO channel unit 310 and to the RT1 interface 410 of the testbed 400.

As noted above, after simulating an off-hook state in step 501, the testbed 400 measures both the delay in receiving, and the duration of, the wink pulse from the E911 switch 170. This process is accomplished by capturing the waveform across the tip-ring pair of the RT1 interface 410 with a digitizer (not shown) in the testbed 400. The testing program is designed to search the captured digitized waveform and determine the delay from the time of the off-hook condition at the RT1 interface 410, as well as the duration of the wink pulse from the simulated E911 switch's CO1 interface 171. If either the wink pulse delay or the duration of the wink pulse is not within specifications, specifically if the delay >4 seconds or the wink duration is outside of a range from 100 ms to 350 ms, then the program will end testing and output a failure message. If the wink pulse is within acceptable parameters, the testbed 400 continues testing.

In step 507, the testbed 400 sends an emergency code (e.g., 911, 11 or 1) to the E911 switch's CO1 interface 171. In this particular testing set-up, the E911 switch 170 is provisioned to pass the call from the PBX to the simulated PSAP (i.e., RT2 interface 420) upon detection of the emergency signal, by sending an alerting signal to the PSAP (RT2) interface. This process is described in greater detail below in steps 509–512. Once the E911 switch's CO1 interface has received the emergency signal, in step 508 it will apply a reverse loop current feed (RLCF) condition towards the RT1 interface 410 to indicate an off-hook condition.

In step 509, after receiving the emergency signal, the CO1 interface 171 provides a signal path to the CO2 interface 172. In step 510, the CO2 interface 172 sends a ring signal to the RT2 interface 420 of the testbed 400.

Similar to the wink signal measurement described above, the testbed 400 measures both the delay in receiving, and the duration of, the ring signal at the RT2 interface 420 from the E911 switch 170. This process is accomplished by capturing the waveform across the tip-ring pair of the RT2 interface 420 with a digitizer (not shown) in the testbed 400. The testing program is designed to search the captured and digitized ring signal and determine the delay from the time the RT1 interface 410 goes off-hook, as well as the duration of the ring signal from the simulated E911 switch's CO2 interface 172. Alternately, the delay could be measured from the time the ring signal is transmitted from the E911 switch, or from the time the emergency signal is sent in step 507. If either the ring signal delay or the duration of the ring signal is too long, for example ring delay >2.4 seconds or ring duration >2.5 seconds, then the program will end testing and output a failure message. If the ring signal is received at the RT2 interface 420 and is within acceptable parameters, the testbed 400 continues testing.

In step 511, at the RT2 interface 420 changes to an off-hook state, thereby completing a path between that interface and the RT1 interface 410, the simulated PBX and PSAP locations. In order to effect an off-hook condition, the testbed 400 removes the 25.6K Ohm resistor from the tip-ring pair at the RT2 interface 420, and applies a 430 Ohm resistor across the tip-ring pair to simulate the PSAP going off-hook. The E911 switch's CO2 interface 172 detects this off-hook condition, and stops sending the ring signal to the RT2 interface.

In step 512, the testbed 400 verifies the quality of the path between the RT1 and RT2 interfaces 410 and 420 by sending a predefined caller's emergency service identification (CESID) pattern (KP+digits+ST) with the following MF signal duration: KP=90 ms; other digits=58 ms; ST=53 ms; and interdigits=58 ms, first from the RT1 interface 410 to the RT2 interface 420. KP stands for key pulse signal, and it is the first signal in an MF outpulsing format. ST stands for start signal, and it is the last signal in the MF outpulsing format. The "other digits" are the multi-frequency tones representing the numbers 0,1, etc. The interdigit time is defined as the sum of the MF signal's fall time, signal-off time, and its rise time. The testbed 400 measures the received CESID pattern at the RT2 interface. If the received CESID pattern is within the following specified range: KP≧55 ms; other digits≧30 ms; ST≧30 ms; and interdigits≧25 ms, the test continues. Otherwise, the test fails. Then the testbed 400 reverses the direction of the transmission signal from the RT2 interface 420 to the RT1 interface 410, and again measures the loss through the system. This is accomplished by using a waveform generator to generate the MF or 1004 Hz tone and apply it as the stimulus to the RT1 interface or RT2 interface, respectively. On the receiving end the testbed 400 uses a digitizer to capture the transmitted tone. The testing program then performs an analysis on the digitized waveform to determine that it is of the correct frequency and power levels. The success of this final testing step will ensure the capability of the tested DLC arrangement and the E911 switch, to support transmission of location data from the PBX to the PSAP.

Figure 6:
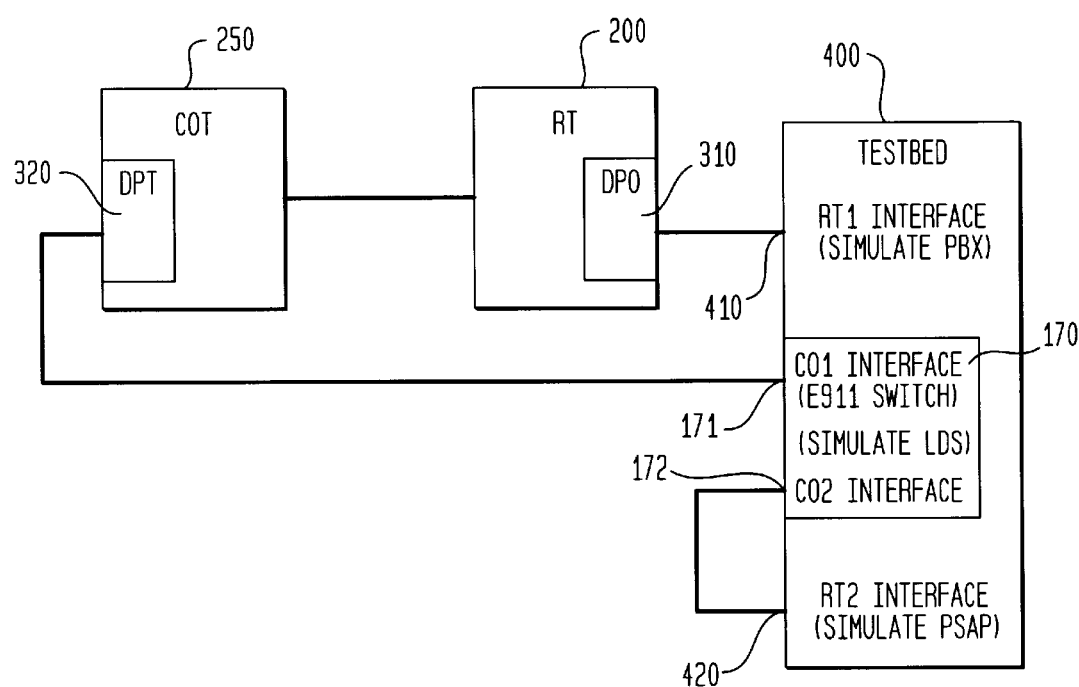
FIG. 6 illustrates another testing setup for enhanced 911 systems employing universal DLC.

The above-described testing system and method provides a new capability to test E911 systems in the laboratory prior to deployment. Those skilled in the art will appreciate that various modifications are possible. For example, FIG. 6 shows an alternate testing arrangement, where the E911 switch 170 is not a separate device, but rather is simulated within the testbed 400. Of course, such simulation within the testbed 400 would entail additional functionality implemented by the testing program resident in the testbed.

Further, it will be appreciated that many channel unit pairs and DLC trunks may be rapidly tested in an automated manner by the above-described method and system. The DLC channels may be tested in parallel if the testbed 400 has a sufficient number of inputs and digitizers, or the channels may be tested serially.

It will be apparent to those skilled in the art that various modifications and variations can be made in the enclosure and method of manufacturing of the present invention without departing from the spirit or scope of the invention. Thus, it is intended that the present invention cover the modifications and variations of this invention provided that they come within the scope of the appended claims and their equivalents.

What is claimed is:

1. A method of testing enhanced 911 signaling over a digital loop carrier, comprising:

signaling an enhanced 911 switch via a digital loop carrier that a first interface of a testing apparatus is in an off-hook state;

determining whether an acknowledgement signal from the enhanced 911 switch has been received at the first interface;

determining a delay in receiving the acknowledgement signal; and ending testing and outputting an error signal if no acknowledgement signal is received or the delay exceeds a predetermined time.

2. The method of claim 1, further comprising:

measuring a duration of the acknowledgement signal.

3. The method of claim 2, further comprising:

ending testing and outputting an error signal if the duration is outside of a predetermined range.

4. The method of claim 3, further comprising:

sending an emergency signal from the first interface to the enhanced 911 switch if the duration and delay of the acknowledgement signal are acceptable.

5. A method of testing enhanced 911 signaling over a digital loop carrier, comprising:

sending an emergency signal from an interface of a testing apparatus to a first interface of an enhanced 911 switch;

generating a ring signal at a second interface of the enhanced 911 switch in response to receiving the emergency signal at the enhanced 911 switch;

determining whether the ring signal from the enhanced 911 switch has been received at a second interface of the testing apparatus;

ending testing and outputting an error signal if no ring signal is received at the other interface of the testing apparatus; and measuring characteristics of the ring signal if received.

6. The method of claim 5, wherein the measuring step includes:

measuring a duration of the ring signal; and determining a delay from sending of the emergency signal to receipt of the ring signal.

7. The method of claim 6, further comprising:

ending testing and outputting an error signal if the duration of the ring signal is longer than a predetermined time or the delay is longer than another predetermined time.

8. The method of claim 7, further comprising:

sending a measurement signal between the interface and the other interface of the testing apparatus if the duration and delay of the ring signal are acceptable.

9. The method of claim 8, further comprising:

measuring characteristics of the measurement signal at each of the interfaces of the testing apparatus.

10. The method of claim 9, further comprising:

ending testing and outputting an error signal if the measured characteristics deviate from acceptable values.

11. A system for testing enhanced 911 signaling over a digital loop carrier, comprising:

a testing apparatus configured to have a first interface and a second interface;

a remote terminal connected to the first interface of the testing apparatus;

a central office terminal connected to the remote terminal by a digital loop carrier;

an enhanced 911 switch connected between the central office terminal and the second interface of the testing apparatus.

12. The system of claim 11, wherein the remote terminal includes a dial pulse originate channel unit.

13. The system of claim 11, wherein the central office terminal includes a dial pulse terminate channel unit.

14. The system of claim 11, wherein the first interface is configured to simulate a private branch exchange.

15. The system of claim 11, wherein the second interface is configured to simulate a public safety answering point.

16. The system of claim 11, wherein the enhanced 911 switch is simulated within the testing apparatus.

* * * * *